United States Patent [19]

Klima et al.

[11] Patent Number: 4,591,988

[45] Date of Patent: May 27, 1986

[54] ENERGY COST ALLOCATION METHOD AND SYSTEM

[75] Inventors: Dennis P. Klima, Chicago; John E. Pakel, Oak Brook, both of Ill.

[73] Assignee: Control Energy Corporation, Oak Brook, Ill.

[21] Appl. No.: 513,219

[22] Filed: Jul. 13, 1983

[51] Int. Cl.[4] .......................... G01K 17/06; G01F 1/86
[52] U.S. Cl. .................................... 364/464; 165/11.1; 364/510; 364/577; 374/39; 374/41
[58] Field of Search .............. 364/464, 465, 560, 577; 165/11 R; 374/39, 41

[56] References Cited

U.S. PATENT DOCUMENTS

| | | | |
|---|---|---|---|
| 4,221,260 | 9/1980 | Otala et al. | 374/39 X |
| 4,306,293 | 12/1981 | Marathe | 364/557 |
| 4,412,647 | 11/1983 | Lampert | 165/11 R X |
| 4,437,771 | 3/1984 | Cazzaniga | 364/557 X |
| 4,455,095 | 6/1984 | Bleiker | 364/557 X |
| 4,459,041 | 7/1984 | Knauss et al. | 374/39 |
| 4,485,449 | 11/1984 | Knauss | 374/41 |

OTHER PUBLICATIONS

Alternatives to Master Metering, pp. 8-35 and 127-133.

Heater Meter, Inc. brochure (7 pages), Aug. 1982.

Primary Examiner—Felix D. Gruber
Attorney, Agent, or Firm—Trexler, Bushnell & Wolters, Ltd.

[57] ABSTRACT

A method for allocating energy costs comprises sensing a first parameter; comparing the sensed parameter with a selectable value of the parameter; initiating recording of data when the sensed parameter bears a predetermined relation to the selectable value; and recording data corresponding in a predetermined fashion to the quantity of energy consumed. The invention also extends to a system for allocating energy costs as a function of at least one sensed parameter. This system comprises a condition responsive element for providing a sensor signal which is a function of the sensed parameter; a control apparatus for comparing the sensor signal with a controllably variable signal corresponding to a selectable value of the parameter, and for producing a control output signal when the sensor signal bears a predetermined relation to the controllably variable signal; a recording apparatus is selectively actuatable for recording data corresponding in a predetermined fashion to the quantity of energy consumed and is actuated in response to the control output signal.

7 Claims, 5 Drawing Figures

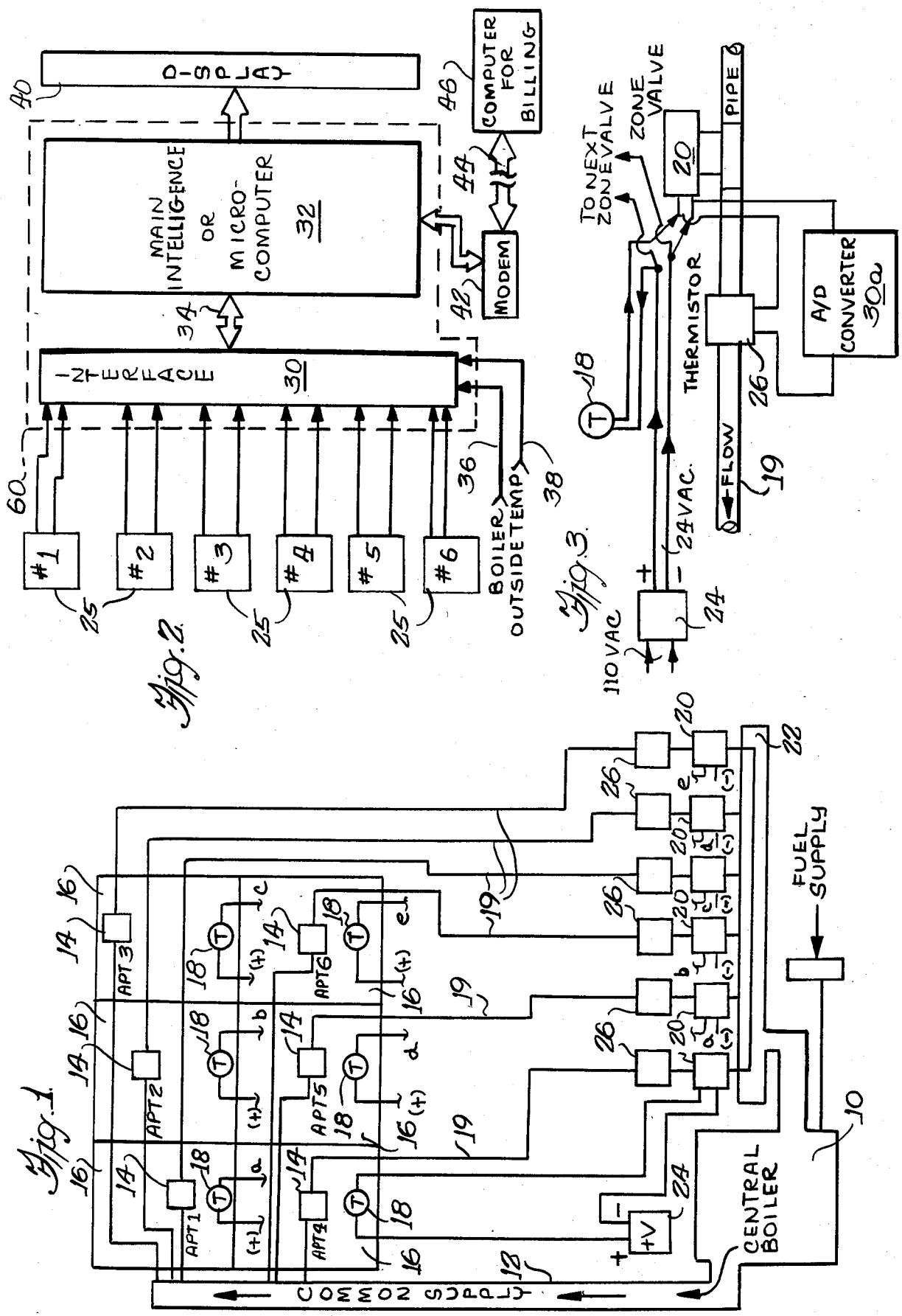

ENERGY COST ALLOCATION METHOD AND SYSTEM

BACKGROUND OF THE INVENTION

The invention is directed generally to a method and apparatus for determining energy usage at a plurality of locations served by a common energy source and allocating the costs of the energy so used accordingly. More specifically, the application is directed to the problem of arriving at an equitable allocation among various tenants of a building of the total heating costs for the building.

In both commercial and residential structures, tenants often control the temperatures of their individual units. However, such multiple-unit structures often have but a single unified heating system serving all units. With energy costs continually increasing, building owners, condominium associations, and the like have become increasingly concerned over the costs of heating. For example, some tenants or unit owners may consume considerably more heat energy than others, whereby equal division of the costs among all owners, in the form of rental increases or maintenance assessments is inequitable.

Accordingly, it is desirable to provide an equitable means of allocating costs of heat energy in accordance with individual tenant's consumption of heat energy. As an additional benefit, it is believed that as individual tenants become aware of the cost of heat energy consumption attributable to them, they will take steps to conserve or control energy usage.

One system has heretofore been proposed, wherein individual meters are installed for each tenant's unit. These meters respond to the tenant's thermostat calling for heat and to the temperature at a given location, such as the hot water in a heating system pipe leading to or from that unit, exceeding a certain level for actuating the meter. Thereupon, the meter records time proportionate units until either the thermostat deactivates or the monitored temperature again drops below a given level.

The foregoing system requires, however, that each unit be visited to set or calibrate the meters and to record the meter reading at periodic intervals, in order to arrive at a cost allocation. Moreover, it has been found that other variables may require a variation or adjustment in the temperature setting at which meter operation is initiated. In the foregoing prior art system, the need for such a change may not become apparent until comparison of meter readings for similarly situated units reveals discrepancies. Moreover, such a change would again require a visit to the individual unit for adjustment, repair or replacement of the temperature monitoring components.

Additionally, the foregoing prior art system makes no provision for detecting other possible malfunctions in the heating system itself or in the individual metering systems. Hence, only careful comparison of successive readings to reveal any discrepancies would generally reveal such malfunctions.

Moreover, it has been found that cost allocation based upon such a meter reading alone may not achieve equitable results. For example, in a given building, some units may consume more energy than other units of the same size in maintaining the same average temperature levels. This may be due to the relative locations of units with respect to outside walls, common walls, and the like. Similarly, outside walls carrying differing numbers of windows and having different directions of exposure (north, south, etc.), may effect heat requirements. Many other physical factors including the construction of the building and location of units may affect heat energy requirements.

Hence, it is desirable to take into account the differing energy requirements of each unit in carrying out the cost allocation process, and updating the parameters monitored by the system.

OBJECTS AND SUMMARY OF THE INVENTION

Accordingly, it is a general object of the invention to provide a novel and improved energy cost allocation method and system which substantially avoid the problems of the prior art.

A related object is to provide such a method and system which is capable of remotely monitoring energy consumption at individual units and allocating overall costs among the units at a single, central location.

A further related object is to provide such a method and system which is capable of automatically effecting adjustments in the operation of the system from a single central location.

In accordance with one aspect of the invention, a method for allocating energy costs comprises sensing a first parameter; comparing said sensed parameter with a selectable value of said parameter; initiating recording of data when the sensed parameter bears a predetermined relation to the selectable value; and recording data corresponding in a predetermined fashion to the quantity of energy consumed.

In accordance with another aspect of the invention, system is provided for allocating energy costs as a function of at least one sensed parameter, said system comprising: condition responsive means for providing a sensor signal which is a function of said sensed parameter; control means including means for comparing said sensor signal with a controllably variable signal corresponding to a selectable value of said parameter, and signalling means for producing a control output signal when the sensor signal bears a predetermined relation to the controllaby variable signal; selectively actuatable means for recording data corresponding in a predetermined fashion to the quantity of energy consumed; and means responsive to said control output signal for actuating said recording means.

BRIEF DESCRIPTION OF THE DRAWINGS

The foregoing, as well as other objects, features and advantages of the invention will become more readily apparent upon consideration of the following detailed description of the illustrated embodiment, together with reference to the drawings, wherein:

FIG. 1 is a diagrammatic representation of a central heating system for a multiple unit structure or building;

FIG. 2 is an electrically circuit diagram, in block form, illustrating the system according to the invention;

FIG. 3 is a further block circuit schematic, illustrating further features of the system in accordance with the invention.

DETAILED DESCRIPTION OF THE ILLUSTRATED EMBODIMENT

Figure 4:
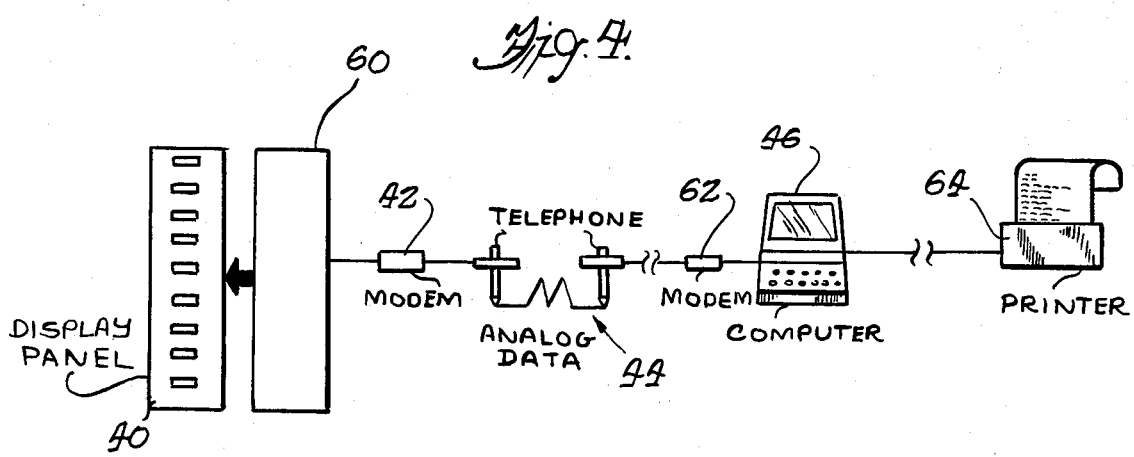
FIG. 4 is a diagrammatic representation illustrating yet further features of a system in accordance with the invention.

Referring now to FIG. 1, an exemplary heating system of a building, in conjunction with which the invention may advantageously be utilized, is illustrated in diagrammatic form. In accordance with conventional practice a central boiler 10, preferably of the hot water type, feeds heated water to a common supply line or conduit 12. This common supply conduit 12 in turn feeds the heated water to individual heating units 14 located in a plurality of apartments or units 16. It will be understood however, that the invention is not so limited, but may be utilized in conjunction with heating systems of other types, for example, steam systems and forced air systems.

Each of these apartments or units 16 is further provided with a conventional thermostat 18 for establishing a desired interior temperature level. Conventionally, these thermostats 18 are each coupled to a suitable flow control valve or "zone valve" 20 located in a return line of the associated heating apparatus 14. These return lines feed a common return conduit or manifold 22 which returns to the central boiler 10.

In this regard, each thermostat 18 is coupled with one side of a suitable power supply 24 whose other side is coupled with one terminal of the associated control valve 20. The circuit from the power supply 24 to each control valve 20 is then completed or broken as the case may be by the associated thermostat 18. In this regard, FIG. 1 fully illustrates the foregoing circuit connections with respect to the unit or apartment 16 designated as "APT 4". The remaining like circuit connections between thermostats 18, power supply 24 and respective control valves 20 are indicated by the respective positive and negative power supply connection indications (+) and (−) and by the respective letters a, b, c, d and e indicated at the respective thermostats 18 and their corresponding control valves 20. That is, when the temperature of the associated apartment 16 falls below the level set at thermostat 18, the thermostat completes the circuit to the associated return valve 20. The valve 20 then opens to allow the flow of hot water through the associated heating unit 14. On the other hand, when the temperature in the apartment reaches or exceeds the temperature set at thermostat 18, the thermostat breaks the circuit to the associated valve 20. This in turn causes the valve 20 to close, interrupting the flow of hot water to the heating unit 14 of the associated apartment.

Departing from convention and in accordance with the present invention, a temperature sensing unit or heat sensor 26 is associated with each return conduit 19. Preferably, this temperature sensor 26 is interposed in the return conduit 19 at a location near the control valve 20 and return manifold 22.

Referring now to FIG. 2, an exemplary energy cost allocation apparatus in accordance with the invention is illustrated in block diagrammatic form. Initially it will be noted that some of the elements of FIG. 1, namely the respective thermostats 18, and associated return line control valves 20, and temperature sensors 26, are here collectively illustrated as respective functional blocks 25. These blocks 25 are further designated #1, #2, etc. to indicate the apartment or unit of FIG. 1 to which they correspond. As illustrated in FIG. 2, an electrical connection from each block 25 is coupled to an associated input of an input interface circuit 30.

This interface circuit 30 converts or otherwise processes the signals received from respective blocks 25 to form a compatible with a main intelligence circuit or microcomputer 32. To this end, a suitable bi-directional interconnection between microcomputer 32 and interface 30 is indicated at 34. Collectively, microcomputer 32 and interface 30 form parts of an "on-site" computer system 60. The interface may also receive inputs from additional condition sensing components such as a suitable boiler temperature sensor as indicated generally at 36 and an outside air temperature sensor as indicated generally at 38 for use by the microcomputer 32 in further monitoring or controlling the heating system of FIG. 1.

The microcomputer 32 is also provided with a suitable display panel 40 for displaying data related to heat consumption in each apartment 16 at the building itself. Additionally, a suitable modem 42 is provided for bi-directionally coupling the microcomputer 32 to conventional telephone lines 44 for the exchange of information with a computer 46 at a central location. In this regard, the invention contemplates that such a central computer 46 may be utilized to exchange data with on-site computers 32 at a plurality of buildings.

Referring now to FIG. 3, the interconnection of the respective temperature sensors 26 and thermostats 18 with the microcomputer 32 is illustrated in additional detail. In this regard, the interface circuits 30 may include appropriate A to D converter circuitry 30a for converting the voltage level utilized by the thermostats 18 (typically 24 V AC) to a signal level compatable with the microcomputer 32.

A typical circuit 25 of FIG. 2 is illustrated in FIG. 3 in additional detail. Briefly, a suitable power supply 24 receives 110 VAC household current and converts it, preferably to the 24 VAC, mentioned above as utilized by the thermostats 18. In this regard, each thermostat 18 is coupled intermediate the positive side of the 24 VAC output of converter 24 and one side of the associated zone valve 20. This common connection between zone valve and thermostat 18 is also coupled to one side of the associated temperature sensor 26, which in the illustrated embodiment comprises a conventional thermistor element. The A/D converter 30a then receives one input from the remaining terminal of thermistor 26 and the other input from the negative side of the 24 VAC line, which is also coupled to the remaining terminal of the zone valve 20.

From the foregoing, it will be seen that the A/D converter 30a receives signals indicative of two conditions of the associated apartment or unit and its associated thermostat, zone valve and thermistor, namely, the "on" and "off" condition of the thermostat 18, as well as the voltage drop across thermistor 26, which is indicative of the temperature sensed thereby. A substantially identical circuit is included for each of the apartment units of FIG. 1 and its associated thermostat 18, zone valve 20 and temperature sensor or thermistor 26. Advantageously, the foregoing requires only that the two lines to the thermistor 26 and the A/D converter 30a be tapped into existing lines at the terminals of the zone valve 20.

Referring briefly to FIG. 4, the on-site microcomputer and associated circuitry thus far described, as well as a suitable display panel for display 40, may be included in suitable housings. Preferably a suitable modem 42 couples the microcomputer 32 with conventional telephone lines designated generally at 44 for communication with a central computer 46, as previously indicated. In this regard, a suitable modem 62 is also provided intermediate the telephone lines 44 and central billing computer 46. Additionally, a suitable printer 64 is preferably provided for the computer 46.

Figure 5:
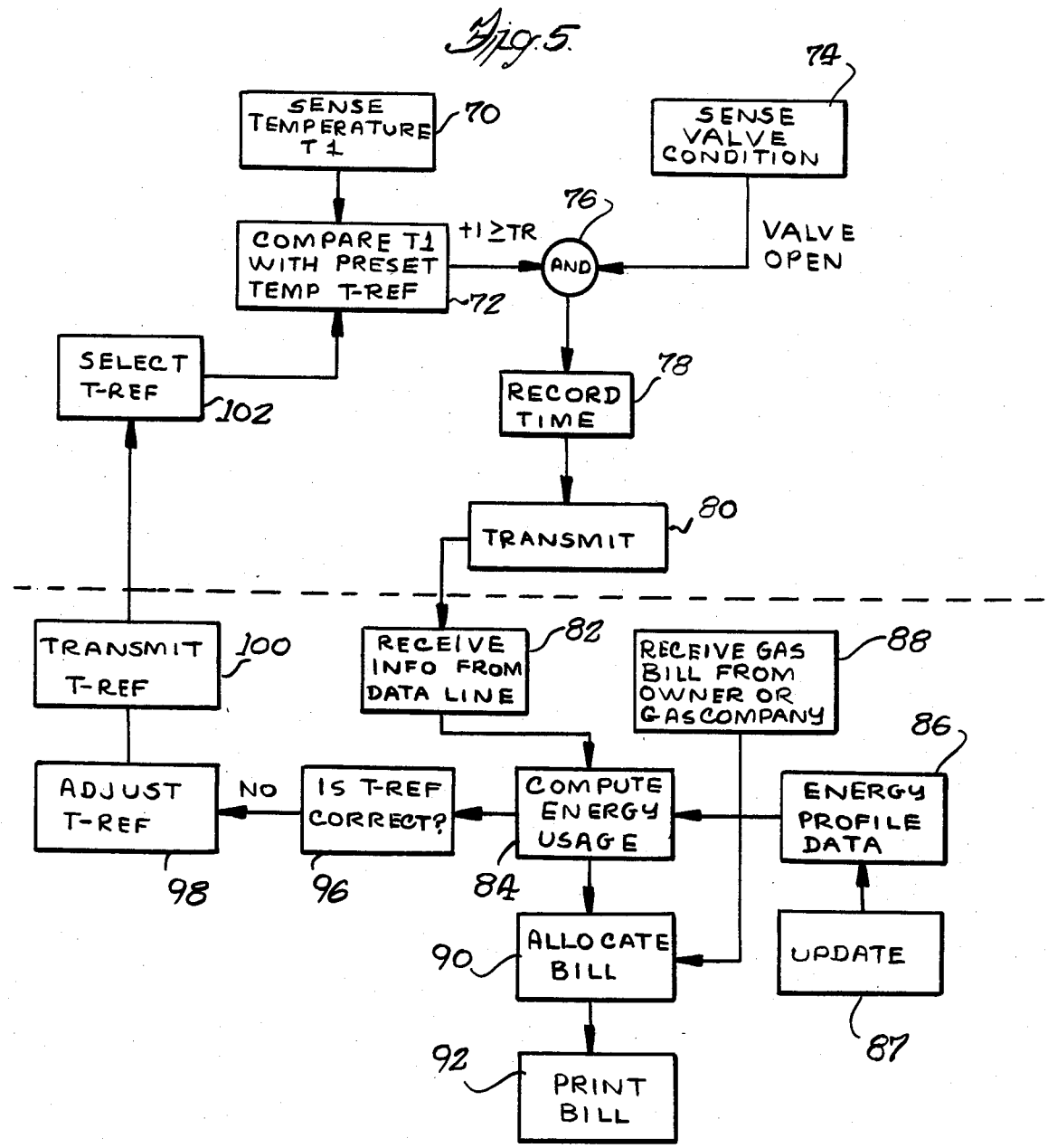
FIG. 5 is a flow chart illustrating a preferred form of a method in accordance with the invention.

Referring now to FIG. 5, the operation of the foregoing apparatus will be described in conjunction with the method of the invention.

As previously indicated, it is an object of the invention to provide a method for allocating the cost of heat energy equitably among a plurality of apartment units served by a single heating system, for example, as illustrated in FIG. 1. Accordingly, each apartment 16 has associated therewith a temperature sensor 20 for sensing the temperature of the hot water in the return line therefrom. In accordance with the invention, this temperature is compared with a predetermined or preset temperature as indicated at 72 in order to determine if heat energy is in fact being delivered to that apartment.

Additionally, a further value or condition is utilized to initiate and terminate the recording of energy consumption data for the apartment. In the illustrated embodiment, this further condition comprises the open or closed condition of the return valve 20, which it will be remembered corresponds with the open circuit or closed circuit condition of the associated thermostat 18. Accordingly, this second sensed value or condition 74 together with the above-mentioned temperature comparison 72 must coexist as indicated by the AND symbol 76 in order to actuate the recording of data as indicated generally at 78. In this illustrated embodiment, this data recording comprises recording of elapsed time.

Hence, when the associated return valve is open and the temperature in the return line is at or above a preselected temperature, both conditions will be detected at the microcomputer 32 (see FIG. 2) and the microcomputer will respond by recording the elapsed time for that apartment.

This elapsed time information may be continuously updated and displayed at all times on the display panel 40 located at the building. However, preferably the data is also transmitted as indicated at 80, at intervals (as called for) to the central billing computer 46. In this regard, it is contemplated that the central billing computer will call up or interrogate the microcomputer 32 at periodic intervals to receive the stored elapsed time data therefrom as indicated generally at 82. As indicated at 84, the central computer 46 will then periodically compute an allocation of the total energy usage for each apartment or unit based upon the corresponding elapsed time data received therefrom.

Additionally, the computer 46 is preferably adapted (as by suitable programming) to take into account other factors in addition to time in computing the allocation for each apartment of total energy consumption. For example, as indicated previously, such factors as the relative size and location of the apartment or other unit within a given building, number of external openings such as windows, doors or the like and direction of exposure(s) may be taken into account in this computation. These factors are here referred to generally as "energy profile data" and indicated generally in FIG. 5 at 86. The method of the invention includes the step of periodically checking and/or updating this energy profile data as indicated at 87. Over a period of time, the experience in allocating costs in a given building may well make such an update desirable for that building.

Having computed the allocation of the total energy usage for each apartment, the central computer 46 also receives the data regarding the energy or fuel bill, such as a gas bill for the entire building as indicated generally at 88. Utilizing the computation of energy consumption from the individual apartments and the overall fuel bill, the computer 46 then allocates this bill among the various apartments as indicated generally at 90. Thereupon, an individual bill for each apartment or unit owner or tenant may be printed as indicated generally at 92.

In accordance with a further feature of the invention, the preselected or preset temperature with which the temperature at each sensor 26 is compared, may also be varied or adjusted, if desired, automatically from the central computer 46. In this regard, based upon the information received from the data line at 82, the computer 84 may also be adapted or programmed to determine whether or not the reference temperature compared with the sensed temperature at 72 is appropriate for proper energy allocation for that unit.

In this regard, it should be recognized that each temperature sensor 26 (see FIG. 3) produces an analog signal corresponding to the temperature thereat. The microcomputer receives this signal in digital form by way of converter 30b and performs the comparison with the preset or preselected temperature internally. However, the preselected temperature with which the comparison is performed may be varied by way of the data bus 50 and I/O select 52 by the main or central computer 46 over telephone lines 44, if desired.

Accordingly, the central computer 46 determines in accordance with appropriate factors whether the reference temperature selected for each temperature sensor 26 is "correct" as indicated generally at 96. If not, the computer 46 performs the necessary calculation to make appropriate adjustments in the value of this reference temperature as indicated at 98. Thereafter, the corrected or updated reference temperature is transmitted over the telephone line as indicated at 100 and utilized by the on-site computer 32 to select or modify the reference temperature utilized as indicated generally at 102.

Accordingly, the described method and system permits remote monitoring of heat energy consumption by each of a plurality of apartments or units in a building, and further permits modification of the data acquisition and cost allocation all over conventional telephone lines, without requiring any visit to the building for such data acquisition. Moreover, corrections in at least the reference temperature utilized in the allocation may also be accomplished without requiring a visit to the building.

In view of the provision of a microcomputer 32 at the building and in communication with the main computer 46, other functions may also be accomplished. For example, suitable sensors on the boiler and an outside air temperature sensor as previously discussed with reference to FIG. 2, may also be monitored by the computer 46 over the telephone lines 44. The computer 46 may utilize this data to accomplish further control over the operation of the central boiler 10, remotely and over the telephone lines 4, in similar fashion to the control over the reference temperature value discussed above.

In this regard, many boiler systems are also equipped to vary the output temperature of the boiler in response to variations in outside air temperature. For example, on a relatively warm day, the boiler may be controlled so as to turn off when the hot water reaching the common supply line reaches a given, relatively lower than usual, temperature. In this regard, it will be recognized that the computer 46 may utilize data regarding outside air temperature and/or boiler output temperature as well in its monitoring and correction of the selected reference temperature as described above.

Additionally, various conditions such as power failure in the building, other failures of the central boiler system, unauthorized access or vandalism or the like may similarly be monitored remotely at the central location in similar fashion to that already described for heat energy consumption monitoring.

What has been illustrated and described herein is a novel method and system for energy cost allocation. While the invention has been illustrated and described herein with reference to preferred embodiments, the invention is not limited thereto. Those skilled in the art may devise various alternatives, changes and modifications upon reading the foregoing descriptions. The invention includes such alternatives, changes and modifications insofar as they fall within the spirit and scope of the appended claims.

The invention is claimed as follows:

1. A system for allocating heating energy costs among a plurality of units served by a common heat generating installation, each said unit including a heat inlet line and a heat return line coupled to the heat generating installation, said heat return line having a valve therein responsive to given control signals for opening and closing, and a thermostat in each said unit for producing the control signals for opening and closing the return line; said allocating system comprising: temperature responsive means located on each said heat return line for providing a temperature signal which is a predetermined function of the temperature at said return line; and microcomputer means responsive to said temperature signal and to the control signal from said thermostat for recording the time during which said temperature signal corresponds to a temperature at or above a predetermined temperature and said thermostat signal simultaneously corresponds to the open condition of said valve; and allocating means responsive to said recorded time data for each of said units for allocating heating energy costs among said units.

2. A system in accordance with claim 1 and further including transmitting means coupled to said microcomputer means for transmitting the data recorded thereby to a remote location.

3. A system in accordance with claim 2 wherein said allocating means is located at said remote location for periodically allocating energy costs in a predetermined fashion in accordance with the recorded data received from said transmitting means.

4. A method for allocating energy costs among a plurality of units served by a common heat generation installation, each unit having a heat inlet line and a heat return line coupled with said heat generating installation, said heat return line having a valve therein responsive to a control signal for opening and closing, and each unit having a thermostat for producing said control signals for opening and closing said return line valve; said method comprising: monitoring the signal condition of said thermostat and the temperature in said control line; and recording data corresponding to the duration of such times during which both the temperature in said return line exceeds a predetermined temperature and also the control signal produced by said thermostat corresponds to the open condition of said return line valve; and allocating, based upon said recorded time data, heating energy costs among said plurality of units.

5. A method in accordance with claim 4 and further including the step of transmitting the data recorded to a remote location.

6. A method in accordance with claim 5 and wherein the step of periodically allocating energy costs is performed at said remote location in a predetermined fashion in accordance with the recorded data received during said transmitting.

7. A method in accordance with claim 6 wherein the step of allocating includes the step of calculating energy costs on the basis of energy profile data for a given location and the step of periodically updating said energy profile data.

* * * * *